(12) United States Patent
Elezabi

(10) Patent No.: US 9,596,055 B2
(45) Date of Patent: Mar. 14, 2017

(54) METHODS, SYSTEMS, AND COMPUTER READABLE MEDIA FOR SIMPLIFIED COMPUTATION OF SQUARES AND SUMS OF SQUARES OF CODE CROSS-CORRELATION METRICS FOR SIGNAL PROCESSING

(71) Applicant: American University in Cairo, Cairo (EG)

(72) Inventor: Ayman Y. Elezabi, Cairo (EG)

(73) Assignee: The American University in Cairo, Cairo (EG)

( * ) Notice: Subject to any disclaimer, the term of this patent is extended or adjusted under 35 U.S.C. 154(b) by 0 days.

(21) Appl. No.: 14/331,898

(22) Filed: Jul. 15, 2014

(65) Prior Publication Data
US 2016/0020871 A1    Jan. 21, 2016

(51) Int. Cl.
*H04B 1/00* (2006.01)
*H04L 1/00* (2006.01)
*H04B 1/7105* (2011.01)

(52) U.S. Cl.
CPC ....... *H04L 1/0052* (2013.01); *H04B 1/71052* (2013.01); *H04L 1/0054* (2013.01)

(58) Field of Classification Search
CPC .................. H04B 1/71075; H04B 7/216
See application file for complete search history.

(56) References Cited

U.S. PATENT DOCUMENTS

| | | | |
|---|---|---|---|
| 5,553,062 A | 9/1996 | Schilling et al. | |
| 5,644,592 A | 7/1997 | Divsalar et al. | |
| 6,161,209 A | 12/2000 | Moher | |
| 7,035,317 B2 | 4/2006 | Elezabi et al. | |
| 7,242,675 B2 | 7/2007 | Schilling et al. | |
| 8,094,699 B2 | 1/2012 | Elezabi | |
| 2003/0081701 A1 | 5/2003 | Pick et al. | |
| 2004/0083082 A1 | 4/2004 | Onggosanusi et al. | |
| 2005/0069023 A1* | 3/2005 | Bottomley | H04B 1/711 375/148 |
| 2005/0128966 A1 | 6/2005 | Yee | |
| 2005/0195889 A1 | 9/2005 | Grant et al. | |
| 2006/0193374 A1 | 8/2006 | Guo et al. | |

(Continued)

OTHER PUBLICATIONS

Notice of Allowance and Fee(s) Due for U.S. Appl. No. 11/901,259 (Sep. 1, 2011).

(Continued)

*Primary Examiner* — Shuwang Liu
*Assistant Examiner* — Gina McKie
(74) *Attorney, Agent, or Firm* — Jenkins, Wilson, Taylor & Hunt, P.A.

(57) ABSTRACT

The subject matter described herein includes a method for simplified computation of metrics of cross-correlations of binary codes and for using the metrics for signal processing applications. The method includes computing an outer product matrix based on a first code vector. The method further includes computing an outer product matrix based on at least one second code vector. The method further includes computing a metric of cross-correlations between the first code and the at least one second code vector using the outer product matrices. The method further includes using the metric to perform a signal processing operation.

35 Claims, 5 Drawing Sheets

(56) References Cited

U.S. PATENT DOCUMENTS

2008/0130797 A1* 6/2008 Cozzo ............... H04B 1/7113
 375/343
2012/0011348 A1* 1/2012 Eichenberger ...... G06F 9/30032
 712/222

OTHER PUBLICATIONS

Notice of Allowance and Fee(s) Due for U.S. Appl. No. 11/901,259 (May 12, 2011).
Interview Summary for U.S. Appl. No. 11/901,259 (Mar. 2, 2011).
Non-Final Office Action for U.S. Appl. No. 11/901,259 (Aug. 25, 2010).
"ZTE and Qualcomm Collaborate to Boost UMTS System Performance," Press Releases, Qualcomm News and Events, pp. 1-2 (Jul. 5, 2009).
Elezabi et al., "Cognitive Interference-Minimizing Code Assignment for Underlay CDMA Networks in Asynchronous Multipath Fading Channels," Proc. of International Wireless Communications and Mobile Computing Conference, pp. 1-5 (Jun. 2009).
Fahmy et al., "Bipolar sequences correlator and squarer for multiple-access systems," Proceedings of 42nd Annual Asilomar Conference on Signals, Systems, and Computers, pp. 1-3 (Oct. 2008).
"Code division multiple access," Wikipedia, http://en.wikipedia.org/wiki/Cdma, pp. 1-8 (Downloaded from the Internet on Sep. 4, 2007).
Elezabi, "Improved Turbo Decoding and Interference Cancellation for DS-CDMA with Random Spreading," IEEE Vehicular Technology Conference, pp. 1-5 (Sep. 25-28, 2006).
Notice of Allowance and Fee(s) Due for U.S. Appl. No. 09/957,339 (Sep. 6, 2005).
Non-Final Office Action for U.S. Appl. No. 09/957,339 (Feb. 8, 2005).
Hsieh et al., "Optimal Two-Stage Decoupled Partial PIC Receivers for Multiuser Detection", IEEE Transactions on Wireless Communications, vol. 4,. No. 1, pp. 112-127 (Jan. 2005).
Morosi et al, "Design of Turbo-MUD Receivers with Density Evolution in Overloaded CDMA Systems," IEEE WCNC, pp. 1-5 (2005).
Elezabi et al., "Improved Viterbi Decoder Metrics for Two-Stage Detectors in DS-CDMA," IEEE Transactions on Wireless Communications, vol. 3, No. 5, pp. 1399-1404 (Sep. 2004).
Morosi et al, "Improved Iterative Parallel Interference Cancellation Receiver for DS-CDMA 3G Systems" IEEE WCNC, pp. 877-882 (Mar. 2003).
Li et al., "Turbo Multiuser Detection for Turbo-Coded CDMA in Multipath Fading Channels," IEEE Transactions on Vehicular Technology, vol. 51, No. 5, pp. 1096-1108 (Sep. 2002).
"3rd Generation Partnership Project; Technical Specification Group Radio Access Network; Multiplexing and channel coding (TDD) (Release 1999)," 3GPP TS 25.222, V3.10.0, pp. 1-40 (Sep. 2002).
"3rd Generation Partnership Project; Technical Specification Group Radio Access Network; Multiplexing and channel coding (FDD) (Release 1999)," 3GPP TS 25.212, V3.10.0, pp. 1-63 (Jun. 2002).
Yu, "Practical Iterative Multiuser Detection for Turbo Encoded Signals in Cdma Systems", IEEE Globecom, pp. 931-935 (2002).
Nordio et al., "Design and Performance of a Low-Complexity Iterative Multiuser Joint Decoder Based on Viterbi Decoding and Parallel Interference Cancellation," IEEE International Conference on Communications, pp. 1-5 (2002).
Wu et al., "An Iterative Multiuser Receiver Using Partial Parallel Interference Cancellation for Turbo-Coded DS-CDMA Systems," IEEE Globecom, pp. 244-248 (Nov. 2001).
Hsu et al., "A Low-Complexity Iterative Multiuser Receiver for Turbo-Coded DS-CDMA Systems," IEEE Journal on Selected Areas in Communications, vol. 19, No. 9, pp. 1775-1783 (Sep. 2001).
"3rd Generation Partnership Project; Technical Specification Group Radio Access Network; Physical channels and mapping of transport channels onto physical channels (TDD) (Release 4)," 3GPP TS 25.221, V4.2.0 (Sep. 2001).
Wu et al, "Soft-Input Soft-Output Partial Parallel Interference Cancellation for DS-CDMA Systems", IEEE ICC, pp. 1-5 (2001).
Kim et al., "Performance of Iterative Multiuser Detection with a Partial PIC Detector and Serially Concatenated Codes", Vehicular Technology Conference, pp. 487-491 (2001).
Elezabi et al., "Improved Single-User Decoder Metrics for Two-Stage Detectors in DS-CDMA," IEEE Vehicular Technology Conference, pp. 1276-1281 (Sep. 2000).
Juntti et al., "Multiuser Receivers for CDMA Systems in Rayleigh Fading Channels", IEEE Transactions on Vehicular Technology, vol. 49,. No. 3, pp. 885-899 (May 2000).
Wang et al., "Iterative (Turbo) Soft Interference Cancellation and Decoding for Coded CDMA," IEEE Transactions on Communications, vol. 47, No. 7, pp. 1046-1061 (Jul. 1999).
Shurk et al., "Integrated Interference Cancellation and Decoding for CDMA Systems using Turbo Code", Proceedings of WCNC, vol. 3, pp. 1-5 (1999).
Elezabi et al., "Two-Stage Receiver Structures for Coded CDMA Systems," IEEE Vehicular Technology Conference, pp. 1425-1429 (1999).
Elezabi et al., "Post-Decoding Interference Cancelaton for Coded CDMA Systems," Proceedings of IEEE International Conference on Information Theory, p. 282 (1998).
Divsalar et al., "Improved Parallel Interference Cancellation for CDMA," IEEE Transactions on Communications, vol. 46, No. 2, pp. 258-268, (Feb. 1998).
Zeng et al., "Modified Viterbi Detection for Recording Channels with Jitter," Proceedings of IEEE International Communications Conference, pp. 305.5.1-305.5.5 (1992).
Varanasi et al., "Multistage Detection in Asynchronous Code-Division Multiple-Access Communications," IEEE Transactions on Communications, vol. 38, No. 4, pp. 509-519 (Apr. 1990).
Pursley, "Performance Evaluation for Phase-Coded Spread-Spectrum Multiple-Access Communication—Part I: System Analysis," IEEE Transactions on Communications, pp. 795-799 (Aug. 1977).
Serfling, "Contributions to Central Limit Theory for Dependent Variables," The Annals of Mathematical Statistics, vol. 39, No. 4, pp. 1158-1175 (1968).

* cited by examiner

METHODS, SYSTEMS, AND COMPUTER READABLE MEDIA FOR SIMPLIFIED COMPUTATION OF SQUARES AND SUMS OF SQUARES OF CODE CROSS-CORRELATION METRICS FOR SIGNAL PROCESSING

TECHNICAL FIELD

The subject matter described herein relates to computing metrics of cross-correlations between codes. More particularly, the subject matter described herein relates to methods for simplified calculation of squares and sums of squares of cross-correlations between binary codes and for using the calculations for signal processing applications.

BACKGROUND

In CDMA and other multiple access communication systems, one function of a receiver is to separate single user signals from multi-user signals. In order to separate a single user signal from the multi-user signal, the single user signal may be despread using a spreading code for the user and the inverse of the spreading algorithm used by the transmitter, i.e. a despreading algorithm. After despreading, the despread single user signal may include bit errors caused, for example, by multiple access interference and channel noise. To remove these errors, the signal is typically passed into a single user decoder, such as a turbo decoder or a Viterbi decoder. The output of the single user decoder is the single user signal with all or some bit errors corrected.

Part of the single user decoding process involves the calculation of decoder log likelihood ratios (LLRs). Conventional LLRs are computed based on assuming that the multiple-access interference (MAI) plus noise is Gaussian. Improved LLRs (ILLRs) that model the MAI as conditionally Gaussian, given the cross-correlations, are described in U.S. Pat. Nos. 7,035,317 and 8,094,699, the disclosures of which are incorporated herein by reference in their entireties.

For those ILLRs, the squares, and sums of squares, of the cross-correlations are needed. The computation of those ILLRs has normally been performed by first computing a cross-correlation between user spreading codes and then computing the squares of the cross-correlations (SXC), and finally computing the sums of the squares of the cross-correlations (SSXC) between the user spreading codes. The computation of the cross-correlations can be computationally intensive because each user spreading code must be combined in a bitwise manner with the spreading code of every other user. The squaring operations required to compute the sum of squares of the cross-correlations are also computationally intensive because squaring requires the multiplication of each cross-correlation by itself in a bitwise manner. The computation of the sums of such quantities involves large adders since the inputs to those adders are the outputs of squaring elements. Furthermore, the cross-correlations must be computed between each user and all other users, making the computational complexity grow as the square of the number of users.

Accordingly, there exists a long felt need for a simplified computation of the SXCs and SSXCs of the code cross-correlations for usage in the ILLRs. Furthermore, the SXC and SSXC metrics appear in other signal processing applications.

SUMMARY

The subject matter described herein includes architectures for computing squares and sums of squares of cross-correlations of bipolar sequences. Both metrics are appear in various signal processing applications, including improved decoders for CDMA systems. The key idea is to compute outer products of each code vector with itself, and formulate the metrics so as to avoid explicit computation of cross-correlations, and so the computations are not needed between every user and all other users. The expensive squaring unit is also eliminated. A detailed complexity analysis is presented, which demonstrates the advantages of these architectures. The methods described herein also offer easier updates in computing the required metrics when there are incremental changes in the multi-user or multi-codesystem. Variations and special cases, including short codes and asynchronous users, and further enhancements are also described.

According to one aspect, the subject matter described herein includes a method for simplified computation of metrics of cross-correlations of binary codes and for using the metrics for signal processing applications. The method includes computing an outer product matrix based on a first code vector. The method further includes computing an outer product matrix based on at least one second code vector. The method further includes computing a metric of cross-correlations between the first code and the at least one second code vector using the outer product matrices. The method further includes using the metric to perform a signal processing operation.

The subject matter described herein may be implemented in software in combination with hardware and/or firmware. For example, the subject matter described herein may be implemented in software executed by a processor. In one exemplary implementation, the subject matter described herein may be implemented using a computer readable medium having stored thereon computer executable instructions that when executed by the processor of a computer control the computer to perform steps. Exemplary computer readable media suitable for implementing the subject matter described herein include non-transitory devices, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

The subject matter described herein will now be explained with reference to the accompanying drawings of which.

DETAILED DESCRIPTION

I. Introduction

Figure 1A:
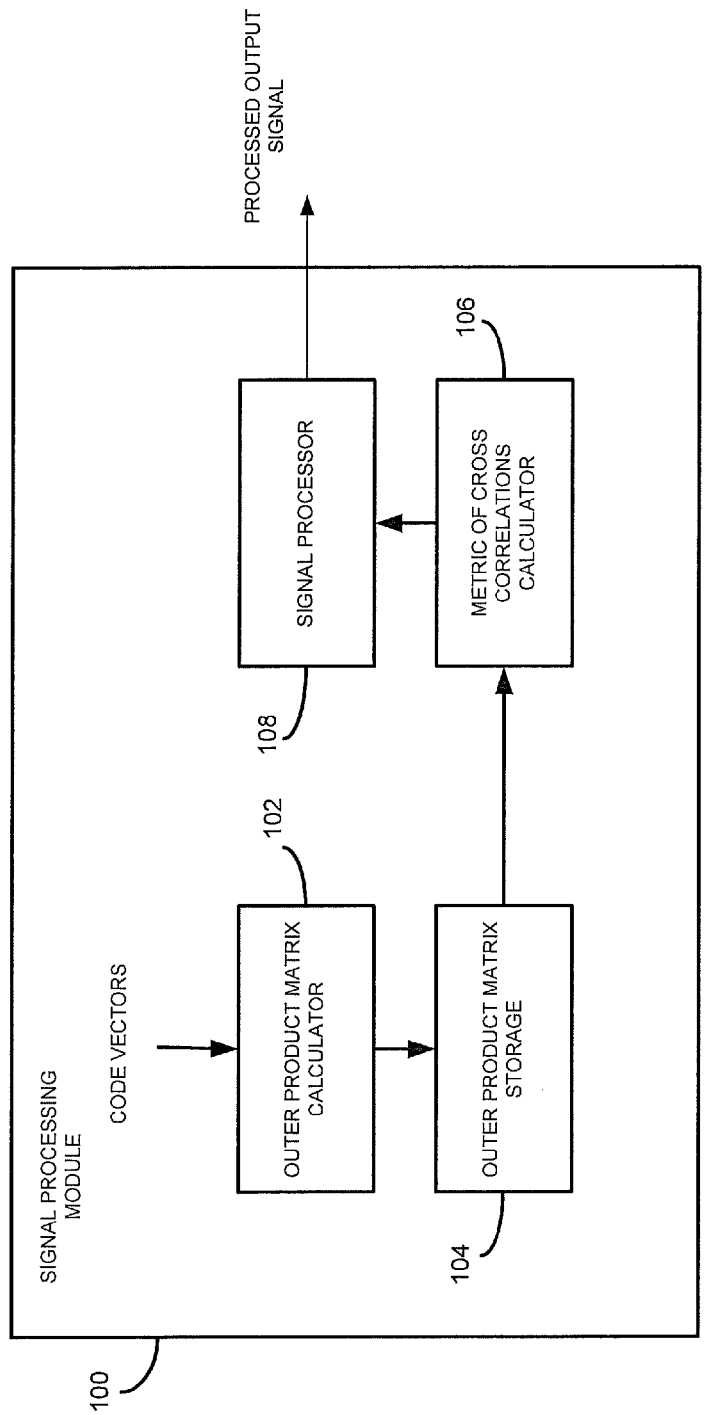
FIG. 1A is a block diagram illustrating an exemplary system for simplified computation of squares of cross-correlations of binary codes and/or sums of squares of cross-correlations of binary codes and for using the computations for signal processing applications according to embodiments of the subject matter described herein.

The initial motivation for this work came from the need to efficiently implement improved decoder log-likelihood ratios (LLRs) for direct-sequence code-division multiple-access (DS-CDMA) systems [1, 2]. The improved LLRs required computations of squares of all user code cross-correlations and their sums. These codes are sequences that take values of ±1. The squares and sums of squares are computed every bit. Therefore, for systems with a practical number of users and spreading factor, efficient architectures are necessary. In fact, it is believed that no attempt has yet been made to improve the single-user decoder metrics in practical chipsets, although significant gains may be obtained using these improved LLRs [3, 4]. It is worth mentioning that the implementation of interference cancellation in commercial CDMA base station chipsets is quite recent [5], despite its existence in the open literature for two decades earlier, e.g. [6]. In [5], it is stated that a capacity improvement of 60% is gained by introducing interference cancellation. The main barrier to these huge capacity gains for such a long time has been implementation complexity, which highlights the importance of efficient architectures. The proposed architecture is presented in a general manner. This is because squares of cross-correlations, and sums of squares of cross-correlations, are important measures that appear in various signal processing problems. Its application to CDMA is also described.

According to one aspect of the subject matter described herein, architectures for directly computing the squares of cross-correlations (SXC) and sums of squares of cross-correlations (SSXC) are described. These new methods are referred to herein as "direct" methods in the sense that they skip intermediate computations. In particular, the direct squares of cross-correlations (DSXC) architecture circumvents the explicit computation of the cross-correlations. More importantly, it completely eliminates the need for a squaring unit. The same applies to the direct SSXC (DSSXC). This is achieved by computing outer products for each code vector with itself, and then formulating the bulk of the computation in terms of the resulting matrices, rather than in terms of pairs of codes. In addition to a more efficient architecture, this also has the advantage of simplifying updates to the SXC and SSXC metrics. Updates are necessary whenever incremental changes occur in the system structure, e.g., when users, or codes, arrive or depart. Variations on the basic architecture for the case of short codes, asynchronous users, and other special cases are also described. A complexity analysis comparing the different methods in the context of a single user of interest and when multiple users are of interest is also presented. The rest of this document is organized as follows. In section II, quantities of interest and the initial CDMA context for this work are described. Section III introduces the DSXC architecture. Section IV introduces the DSSXC architecture and includes a complexity analysis and comparisons. In section V several variations including computations for short codes and asynchronous users are described. In section VI insights on the core ideas behind the proposed architectures and further work and potential enhancements are described. In section VII, a receiver that implements the subject matter described herein and an overview of the process that may be implemented by such a receiver are described.

II. System Model

The cross-correlation $r_{jk}$ between two time-aligned code sequences j and k of length N is given by $$r_{jk} = s_j \cdot s_k^T = \sum_{l=0}^{N-1} s_{j,l} s_{k,l} \tag{1}$$

where $s_j = [s_{j,0}, s_{j,1} \ldots s_{j,N-1}]$ is the code sequence j and the superscript T denotes a transpose.

In the context of CDMA on the AWGN channel, the cross-correlations between the code sequences of two users appear in the multiple-access interference plus noise variance (MAINV) which may be utilized in improved LLRs for the channel decoders [3, 4]. The MAINV seen by user j after despreading is given by $$\eta_j^2 = \sum_{k=1, k \neq j}^{K} r_{jk}^2 E_k + \sigma^2 \tag{2}$$

where $E_k$ is the average received bit energy of user k, K is the number of active users, and $\sigma^2$ is the thermal additive white Gaussian noise variance. Hence, our first desired metric is the SXC $r_{jk}^2$.

III. Direct Squares of Cross-Correlations (DSXC)

An efficient method is now described for directly computing the square of the cross-correlation, i.e. without first computing the cross-correlation. This method is referred to herein as the direct square of cross-correlation (DSXC). To this end, the square of the cross-correlation can be expressed as follows $$r_{jk}^2 = \sum_{l=0}^{N-1} s_{j,l} s_{k,l} \sum_{m=0}^{N-1} s_{j,m} s_{k,m}$$
$$= \sum_{l=0}^{N-1} \sum_{m=0}^{N-1} (s_{j,l} s_{j,m})(s_{k,l} s_{k,m})$$

Note that each product term in parentheses is a function of one user only. Hence, for each user j, an N×N matrix $Q_j$ whose elements are the product of each chip in the code of user j with every other chip, i.e., the outer product of the code vector of user j with itself, is defined. Hence, $$Q_j = s_j^T \cdot s_j \tag{3}$$

This matrix is referred to herein as the outer product matrix (OPM) for user j and its elements are denoted by $Q_j(l,m) = s_{j,l} s_{j,m}$. Clearly, each of the OPM elements may be obtained using the XNOR gate in bipolar form, as in [7]. The matrix Q is symmetric, and its diagonal elements are all equal to one. Hence, only $((N^2-N)/2)$ XNOR operations are required per user. The SXC can be expressed as follows as $$r_{jk}^2 = \sum_{l=0}^{N-1}\sum_{m=0}^{N-1} Q_j(l,m)Q_k(l,m) \quad (4)$$

The products $Q_j(l,m)Q_k(l,m)$, which are the elements in the double summation in (4), are also computed using the XNOR gates, and again $((N^2-N)/2)$ operations are required. Finally, all of the elements of the matrix that result from the element-wise XNOR of the two matrices $Q_k$ and $Q_j$ are added. Since these elements take values of $\pm 1$, this last summation can be implemented using the reduced complexity architecture introduced in [7], where the number of ones is simply counted. Assuming the number of ones is x, then $r_{kj}^2=[2\times((N^2-N)/2)]*2+N=4x-N^2+2N$. Thus, the present embodiment completely eliminates the need for any squaring unit. Furthermore, the OPMs may be computed only for a user or code that enters the system.

IV. Direct Sums of Squares of Cross-Correlations (DSSXC)

The direct method for computing the squares of cross-correlations described above allows further reduction in complexity when obtaining the SSXC. The SSXC is the summation term in (2) assuming equal received user powers. In the context of CDMA systems, this is a valid and common assumption based on the power control applied by the base station. In other contexts, the SSXC is the desired metric in its own right, and where the SXCs are not scaled. Consequently, the SSXC will be, henceforth, expressed as $$A_j = \sum_{k=1}^{K} r_{jk}^2 \quad (5)$$

Clearly, in the context of CDMA, the MAINV may be obtained easily from $\eta_j^2=E(A_j-N)+\sigma^2$ where E is the average bit energy for all users. Substituting for the SXC from 4, the SSXC can be expressed as follows $$A_j = \sum_{k=1}^{K}\sum_{l=0}^{N-1}\sum_{m=0}^{N-1} Q_j(l,m)Q_k(l,m) \quad (6)$$

$$= \sum_{l=0}^{N-1}\sum_{m=0}^{N-1} Q_j(l,m)\sum_{k=1}^{K} Q_k(l,m) \quad (7)$$

Note that the innermost summation is carried out over all users and is, like the OPMs, computed once for all the users regardless of the current user of interest j. Therefore, a new matrix $Q_S$ equal to the sum of (all) outer product matrices (SOPM) is defined and can be expressed as:

$$Q_S = \sum_{k=1}^{K} Q_k \quad (8)$$

Note that the computation of the elements of $Q_S$ is again efficiently performed by counting the number of ones in the locations (l,m) in all K OPMs.

The SSXC is thus given by $$A_j = \sum_{l=0}^{N-1}\sum_{m=0}^{N-1} Q_j(l,m)Q_s(l,m) \quad (9)$$

Here, the step of computing the square of cross-correlations is completely avoided, even in its efficient form, and instead, the SSXC is directly computed. Hence, this form is referred to herein as direct SSXC (DSSXC). Also note that while the elements of $Q_s$ are no longer confined to $\pm 1$, the element-wise XNOR in (9) is still applicable between the signs of the elements of the matrices $Q_j$ and $Q_S$. The double summation in (9) is itself, on the other hand, carried out using full adders.

Finally, the form (9) has the additional advantage that if the user energies are unequal in (2), the direct methods can still be utilized since a single SOPM is all that is present. This would be given by $Q_S=\Sigma_{k=1}^{K}E_kQ_k$. The SSXC can still be computed from (6) to maintain the architectural advantage of using counters rather than adders, but at the expense of more repetitive computations.

4.1 Complexity Analysis

The following table provides a comparison where $N_r^2=(N^2-N)/2$ represents the reduced computation size due to matrix symmetry. Moreover, for clarity of presentation and because the savings are applicable only to bit-synchronous systems, the computational savings in the last column due to $r_{jk}=r_{kj}$ are ignored.

| | Operation | $r_{jk}^2$ | $A_j = \Sigma_k r_{jk}^2$ | $A_j$ for all K users |
|---|---|---|---|---|
| Correlator and squarer of [7] | XNORs | N | (K − 1)N | K(K − 1)N |
| | COUNTs | N | (K − 1)N | K(K − 1)N |
| | SQUAREs | 1 | K − 1 | K(K − 1) |
| | ADDs | 2 | 2(K − 1) | 2K(K − 1) |
| | SHIFTs | 2 | 2(K − 1) | 2K(K − 1) |
| Proposed DSXC and DSSXC based on (6) | XNORs | $3N_r^2$ | $(K + 1)N_r^2$ | $2KN_r^2$ |
| | COUNTs | $N_r^2$ | $KN_r^2$ | $KN_r^2$ |
| | ADDs | 1 | $N_r^2(K + 1) + 1$ | $N_r^2(K^2 + 1) + K$ |
| | SHIFTs | 1 | $N_r^2$ | $N_r^2$ |
| Proposed DSXC and DSSXC based on (9) | XNORs | $3N_r^2$ | $2KN_r^2$ | $N_r^2 K(K + 1)$ |
| | COUNTs | $N_r^2$ | $KN_r^2$ | $K^2 N_r^2$ |
| | ADDs | 1 | 2K − 1 | K(2K − 1) |
| | SHIFTs | 1 | K | $K^2$ |

The third column in the table is the square of the cross-correlation between two codes in the most general case. The fourth column is the SSXC computation for a particular user of interest only. This is needed in several cases. Examples are when it is desirable to selectively switch on such a module for certain users, e.g. those with poor reception, and in the context of CDMA, for a downlink receiver j that knows, or estimates, the active codes. The last column is the SSXC computation for all users, which is typically needed at the base station receiver. Note that the methods in [7] do not enjoy savings due to symmetry and hence the number of computations is in terms of N and not $N_r$. The SSXC based on 6 carry out the inner summations first, then sum over all users. Under favorable conditions and/or with good interference cancellation, the number of users supported K may be close to the spreading factor N. For such a case, and considering the last column, the direct methods have an advantage over the earlier methods in [7] by eliminating the expensive squaring operations.

V. Practical Variations and Special Cases
A. Short Codes

The DSXC and SSXC architectures can offer more than the reduced complexity demonstrated thus far.

Let us consider systems that use short codes. In the context of CDMA, these are systems with code sequences that repeat every bit, but in a more general context they are codes with periods that are small enough that they may be processed and/or stored in one shot. Even here, the problem defies offline computation and storage in all but very small systems. For example the number of possible combinations of K active codes out of a set of S available codes is C(S,K) or "S choose K". Hence, the number of SSXC's to compute is $S2^{S-1}-S$. Since a typical value of S is 64, then the cross-correlations must be computed real-time, even for short codes. However, users enter and leave the system at random times, and the conventional way of computing the cross-correlations, even with improved architectures as in [7], requires recomputation of all cross-correlations, their squares, and SSXC, any time a single user enters or leaves the system. On the other hand, in the direct methods, for short codes, the OPMs may be computed offline and stored, which would mean computing only SOPMs. Alternatively, they may be computed once for every arriving user and discarded for a user leaving the system. More importantly, the SOPM $Q_S$ may be updated simply by adding the OPM for an arriving user and by subtracting the OPM for a departing user. The simplicity of updates using the direct architectures is very evident.

B. Asynchronous Users

For bit-asynchronous codes, there may be random and time-varying delays between user codes, e.g. in cellular networks. In the conventional method of computing cross-correlations, any change in the relative delay of a single user again requires recomputation of all cross-correlations, SXCs, and SSXCs. As mentioned earlier, the direct architectures overcomes this problem by formulating the required computations in such a way that they do not contain terms involving pairs of users. As noted earlier, in (4) the terms in parenthesis depend on each user separately. Hence, a relative delay will appear as an offset in the indices (l,m) of the appropriate matrix $Q_j$. For example, assume user j is delayed by D chips relative to user k.

The cross-correlation would then be $$r_{jk} = \sum_{l=0}^{N-1} s_{j,l} s_{k,(l+D) \% N} \tag{10}$$

where X % N denotes X modulo-N.

Now, obtaining the square of the cross-correlation using the direct method can be expressed as $$r_{jk}^2 = \sum_{l=0}^{N-1} \sum_{m=0}^{N-1} Q_j(l,m) Q_k((l+D) \% N, (m+D) \% N) \tag{11}$$

This means that the matrix $Q_j$ for each user j may still be computed offline, or computed upon entry of user j, and then the time-varying relative delays between users will simply translate to some modulo-N offset in the row and column indices of the matrix. In other words, the matrices need only be circularly left or right shifted by D, but need not be recomputed.

Now, to compute the SSXC in the case of asynchronous users the relative delays $D_{jk}$ between user j and any other user k requires definition. Hence, (9) becomes $$A_j = \sum_{l=0}^{N-1} \sum_{m=0}^{N-1} Q_j(l,m) \cdot \sum_{k=1}^{K} Q_k((l+D_{jk}) \% N, (m+D_{jk}) \% N) \tag{12}$$

Here, unless there is only a single user of interest, the innermost summation would have to be computed for each user j. Therefore, there is no longer a global SOPM $Q_S$, but, instead, a local SOPM $Q_{S_j}$. Nevertheless, the only OPMs $Q_k$ that need to be circularly shifted to update those local SOPMs are those corresponding to users {k} whose relative delays $\{D_{jk}\}$ have changed.

C. Other Variations

It is worth mentioning that code sequences that repeat every few bits, although technically not considered short codes, would benefit from the above complexity reduction. This is the case when the ratio between the period of the code sequence L and the spreading factor N is a small integer, e.g. 2 or 4. The matrix sizes would be L×L, and the operations for SXCs and SSXCs would be of size N. This last comment also applies to multi-rate CDMA systems, where spreading factors are variable and different across users.

In the above analysis, chip-synchronous users are assumed for convenience, i.e. in the context of CDMA the delays are an integer number of chips. However, the subject matter described herein may be extended to the chip-asynchronous case in a straightforward manner by considering the samples of each chip as a repetition of the chip value. In this case, the effect of the pulse shape, which is usually non-rectangular in practice, may be taken out as a multiplicative common factor.

VI. Conclusions and Further Enhancements

The subject matter described herein includes architectures for computing squares, and sums of squares, of cross-correlations (SXC and SSXC, respectively) of bipolar sequences. The core ideas behind these novel architectures are two: firstly, the direct computation of the squares of cross-correlations (and subsequent quantities) without computing the cross-correlation and eliminating the expensive squaring unit, and secondly, defining outer product matrices (OPMs) of code vectors and thus formulating the computations in a way that avoids computing quantities that are explicit functions of pairs of codes.

The initial context of this work is code sequences used in DS-CDMA. However, the techniques may be applied in other signal processing problems where these quantities are needed. A complexity analysis is presented for the proposed architectures and the architectures are compared with previous enhancements of conventional methods of computing the SXC and SSXC. Special cases found in practical problems are then discussed and variations on the architecture for asynchronous codes. The advantage of the direct methods in the updates of quantities of interest due to user arrival or departure or other variations in the system structure are also presented.

In the context of cellular CDMA, the usage of SSXC for improving the LLR of the channel decoder is more suitable for the uplink since the base station receiver has the information about active users necessary for such operations. The mobile receiver on the other hand typically has information only about its own code. As illustrated above, however, in the computation of SSXCs for a single user of interest, explicit knowledge of cross-correlations, and consequently user codes, is not needed. It is therefore reasonable to conjecture that observation of the aggregate MAI signal by the user may lead to a good estimate of the SSXC (see ideas in [8]). This is an interesting problem to work on for improving the downlink single-user decoder and, may also be a basis for an improved adaptive single-user detector for the downlink. Another idea is to examine the effect of computing only a partial SSXC, since it is expected that, even for users with equal received power, a few cross-correlations will dominate the SSXC. Finally, an examination of the possible implementation of such architectures below the gate level may yield further savings.

VII. Exemplary Signal Processing Architecture

In one embodiment the simplified squares and/or sum of squares calculations can be used in a signal processor that uses the calculations to perform a signal processing operation, such as decoding. FIG. 1A illustrates an exemplary signal processing module that uses the cross-correlation calculations described herein to improve a signal processing application. Referring to FIG. 1A, a signal processing module 100 may be an ASIC, an FPGA, or other special purpose hardware for performing a signal processing operation. In the illustrated example, signal processing module 100 includes an outer product matrix calculator 102 for computing an outer product matrix based on a first code vector and for computing an outer product matrix based on at least one second code vector. For example, outer product matrix calculator 102 may precompute and store in memory 104 outer product matrices for each binary code that is present in a signal processing system.

Signal processing module 100 further includes a metric of cross-correlations calculator 106 for computing a metric of cross-correlations between the first code and the at least one second code vector using the outer product matrices. In one example, the metric of cross-correlations is the square of the cross-correlations, which may be useful in decoding applications between two users, e.g., a user of interest and a single interfering user, or a dominant interfering user from among a multiplicity of users. The square of the cross-correlations may be computed using the outer product matrices of the code vectors without computing the cross-correlations themselves and without performing a squaring operation, as described above.

In an alternate example, the metric of cross-correlations comprises a sum of squares of the cross-correlations of the code vectors. The sum of squares of the cross-correlations may be computed by first computing the square of the cross-correlations using Equation 6 above, or without first computing the squares of the cross-correlations using Equation 9 above.

Signal processing module 100 further includes a signal processor 108 for using the metric to perform a signal processing operation. In one example, as will be described in detail below, signal processor 108 comprises a decoder for correcting errors in a single user signal despread from a multi-user signal in a multiple access communications system.

Figure 1B:
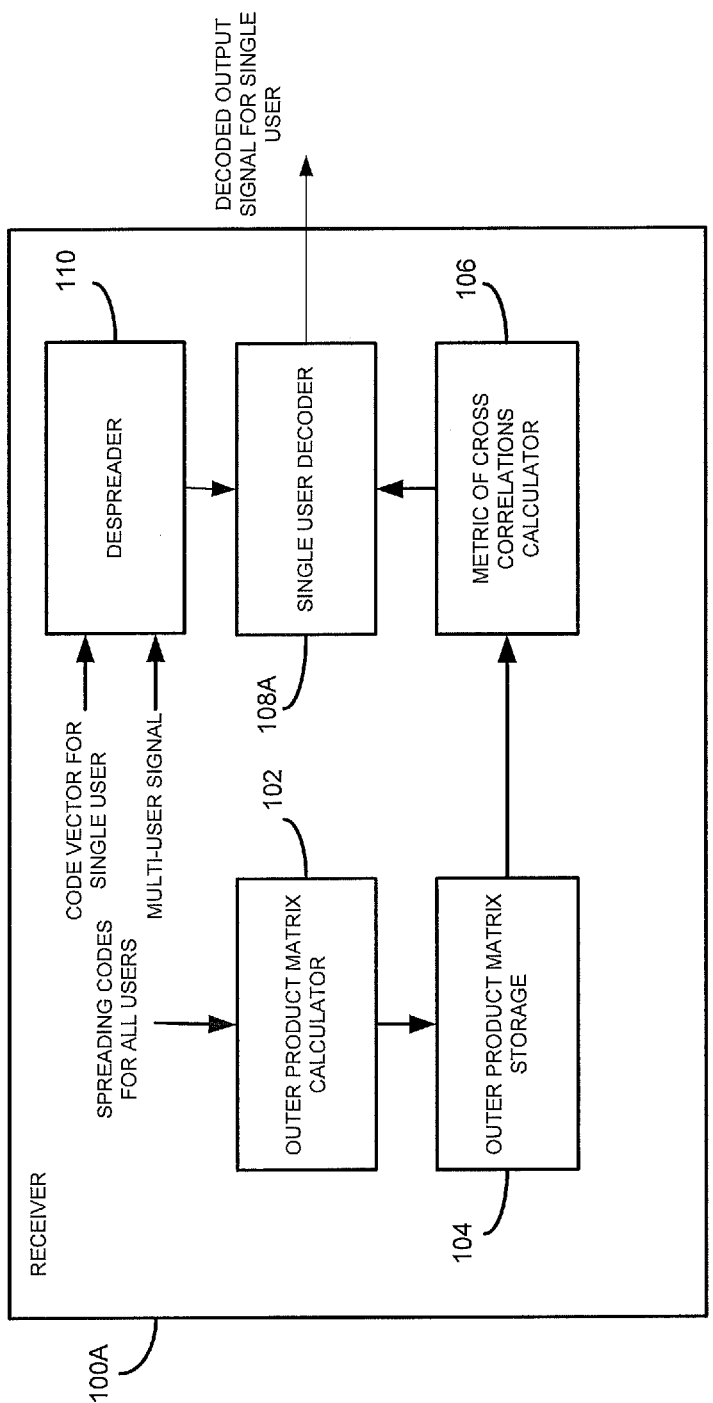
FIG. 1B is a block diagram illustrating an exemplary system for simplified computation of squares of cross-correlations of binary codes and/or sums of squares of cross-correlations of binary codes and for using the computations for decoding applications according to an embodiment of the subject matter described herein.

In one embodiment, the simplified squares and/or sum of squares of cross-correlations calculations can be used by a single user decoder, such as a Viterbi decoder or a turbo decoder that corrects errors in single user signals despread from multi-user signals in a multiple access communications system. FIG. 1B illustrates a receiver that implements the simplified sum of squares calculation according to an embodiment of the subject matter described herein. Referring to FIG. 1B, receiver 100A includes an outer product matrix calculator 102 for computing an outer product matrix based on a code vector of a single user and for computing an outer product matrix based on a code vector of at least one additional user. In one implementation, outer product matrix calculator 102 may calculate and pre-store in memory 104 outer product matrices for all users in a communications system. Such pre-computation enables fast run time calculation of SXCs and SSXCs as a function of the spreading codes of individual users. In another example, outer product matrix calculator 102 may compute an outer product matrix for each user when the user enters the communications system and may delete the outer product matrix for the user when the user leaves the communications system.

Receiver 100A further includes metric of cross-correlation calculator 106 for computing squares of cross-correlations between code vectors and/or sums of squares of cross-correlations between the code vectors of the single user and the at least one additional user using the outer product matrices. Cross-correlations metric calculator may implement the calculations described above with respect to FIG. 1A using spreading codes of the users in a multiple access communications system as the code vectors.

Receiver 100A further includes a despreader 110 for despreading, from a multi-user signal, the signal for a single user. Despreader 110 receives as input the multi-user signal and the spreading code or code vector for the single user of interest. The despreading operation may be thought of as the inverse of the spreading operation performed by the transmitter, since it returns the spread signal back into its original narrowband format. It is performed by multiplication of the received multiuser signal by the spreading code of the user of interest and integrating over a symbol interval. Receiver 100A further includes a single user decoder 108A for decoding, from the despread signal from the single user and using the sum of squares of the cross-correlations calculated as described above, a signal for the single user. Decoder 108A may be a Viterbi decoder, a turbo decoder, or any other decoder capable of correcting bit errors in a despread single user signal.

Figure 2:
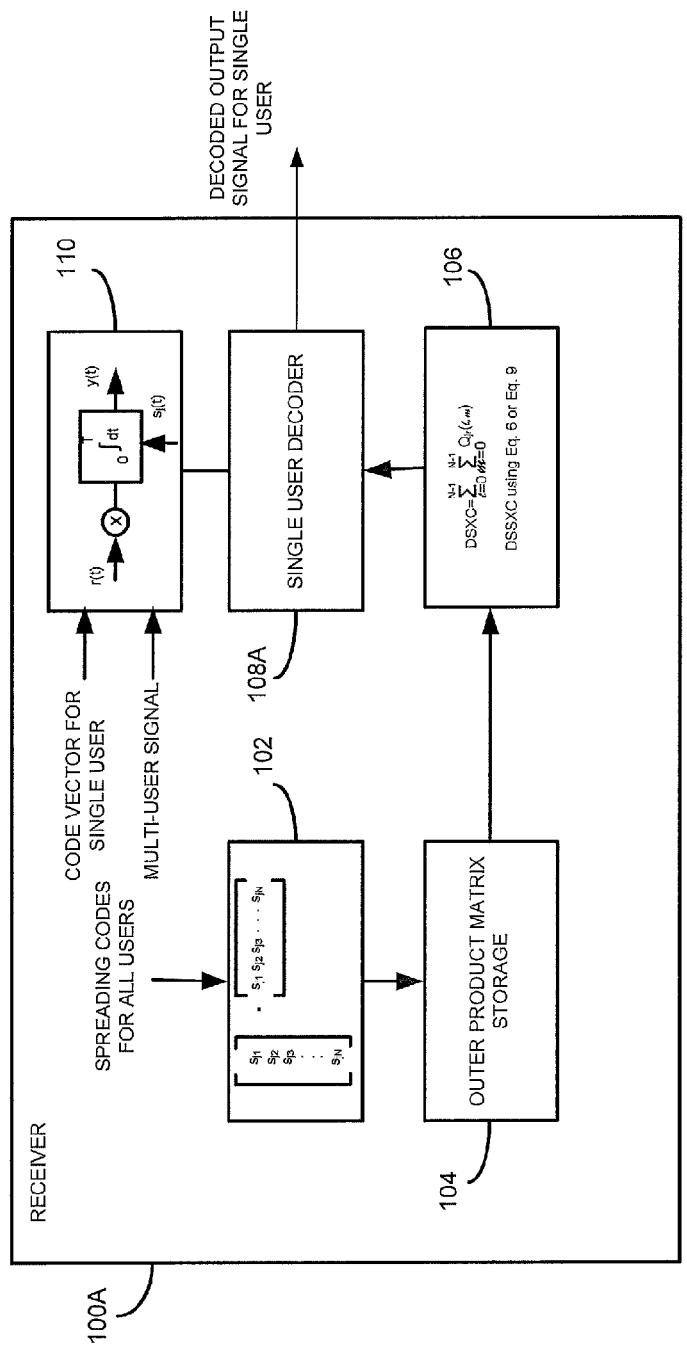
FIG. 2 is a block diagram illustrating exemplary calculations that may be implemented to the outer product matrix calculator, the metric of cross-correlations calculator, and the despreader of FIG. 1B.

FIG. 2 is a block diagram illustrating exemplary calculations that may be implemented to the outer product matrix calculator, the metric of cross-correlations calculator, and the despreader of FIG. 1B. Referring to FIG. 2, OPM calculator 102 calculates the OPMs for each user or code in the system by multiplying the code vector for each user the transpose of the code vector for each user to produce an N×N OPM matrix. In the illustrated example, the OPM for user j is computed using the code vector for user j whose elements are denoted sj1, sj2, sj3, . . . sjN, where N is the code length. The OPM for user j is denoted Qj. Metric of cross-correlations calculator 106 computes the DSXC by performing an element-wise multiplication of the N×N OPM for user j and the N×N OPM for user R. Metric of cross-correlations calculator may use Equation 6 to calculate the DSSXC from the DSXC or Equation 9 without first computing the DSXC. Despreader 110 performs the despreading operation for a user j with a spreading code sj(t) by receiving a multi-user spread signal r(t), multiplying the signal times sj(t) and integrating the multiplied signal over a time period T to produce a despread output signal y(t).

Figure 3A:
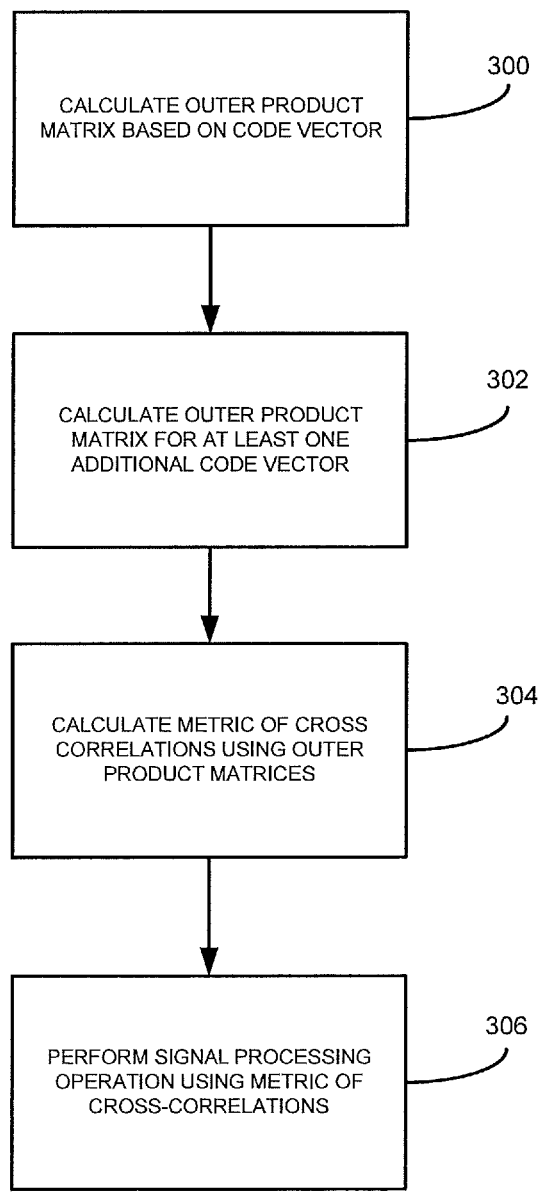
FIG. 3A is a flow chart illustrating an exemplary process for simplified computation of squares of cross-correlations of binary codes and/or sums of squares of cross-correlations of binary codes and for using the computations for signal processing applications according to an embodiment of the subject matter described herein.

FIG. 3A is a flow chart illustrating an exemplary process for simplified computation of cross-correlation metrics and for using the metrics in a signal processing application according to an embodiment of the subject matter described herein. Referring to FIG. 3A, in step 300, an outer product matrix in computed based on a first code vector. The outer product matrix may be calculated by outer product matrix calculator 102 for a code vector of interest using Equation 3 above. In step 302, an outer product matrix is computed based on at least one second code vector. The outer product matrix for other code vectors in a signal processing system may also be computed by outer product matrix calculator using Equation 3 above. In step 304, a metric of cross-correlations between the first code and the at least one second code vector is computed using the outer product matrices. The metric may be the square of the cross-correlations and/or the sum of squares of the cross-correlations. If the metric is the square of the cross-correlations, the metric may be computed by metric of cross-correlations calculator 106 using Equation 4 above. If the metric is the sum of squares of the cross-correlations, the sum may be computed using either Equation 6 or Equation 9 above. In step 306, the metric is used to perform a signal processing operation. In one example, as will be described in more detail below, the metric is used to perform a decoding operation.

Figure 3B:
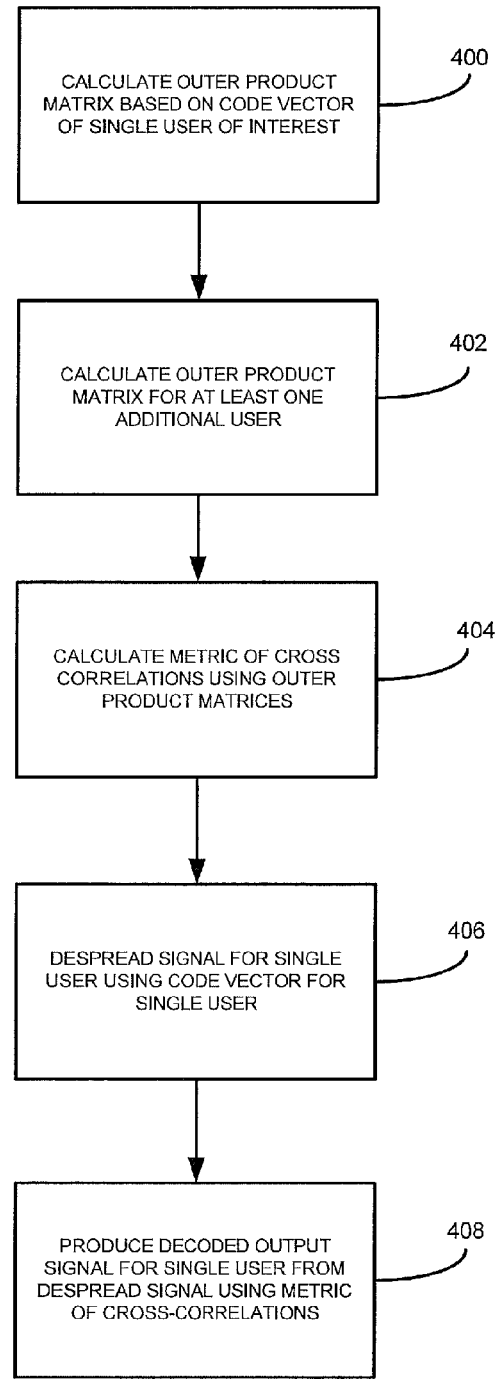
FIG. 3B is a flow chart illustrating an exemplary process for simplified computation of squares of cross-correlations of binary codes and/or sums of squares of cross-correlations of binary codes and for using the computations for decoding applications according to an embodiment of the subject matter described herein.

FIG. 3B is a flow chart illustrating an exemplary process for simplified computation of code cross-correlation metrics and for using the metrics to decode single user signals according to an embodiment of the subject matter described herein. Referring to FIG. 3B, in step 400, an outer product matrix is computed based on a code vector of a single user. The outer product may be computed by outer product matrix calculator 102 using Equation 3 set forth above.

In step 402, the outer product matrix is computed for at least one additional user. For example, outer product matrix calculator 102 may compute the outer product matrix for each user currently attached to a base station and when new users enter the communication area of a base station. The outer product matrix calculations may be performed using Equation 3 above.

In step 404, a metric of cross-correlations between code vectors of the single user and the at least one additional user is computed using the outer product matrices. The metric may be the square of the cross-correlation between at least two user codes and/or the sum of squares of the cross-correlations between the user codes.

In step 408, the signal for the single user is despread from a multi-user signal using the code vector for the single user. The despreading operation may be performed by despreader 110.

In step 410, the decoded signal for the single user is produced from the despread signal for the single user using the sum of squares of the cross-correlations. The denominator of the ILLR is multiplied by the SSXC appropriately scaled for different user energies and with background noise variance added to it, as in Equation 2 above. This operation may be performed by single user decoder 108A.

It is understood that signal processing module 100 and receiver 100A may each constitute a special purpose computing platform that performs a signal processing function. For example, signal processing module 100 and or receiver 100A may function as a component of air interface telecommunications and/or data network equipment, such as a base station or an eNode B. As such, receiver 100A may include hardware and at least one ASIC, FPGA, or other processor for implementing the calculations for the sum of squares of cross-correlations and for decoding single user signals. Outer product matrix calculator 102 and metric of cross-correlations calculator 106 improve the function of signal processing module 100 and/or receiver 100A over conventional signal processing devices that are required to first compute the cross-correlations between all pairs of users, then the squares of the cross-correlations, and finally the sums of squares of the cross-correlations between the codes of the user signals. Receiver 100A avoids the need to first compute the cross-correlations or to perform squaring operations by computing the outer product matrices, which depend only on the spreading code of an individual user. As such, receiver 100A may improve the function of an eNode B or base station by simplifying the decoding of multi-user signals, allowing the decoding to be performed in less time and/or using fewer computing resources.

Particular decoding applications for the simplified SXC and SSCX calculations described herein include calculation of the LLRs for full and partial parallel interference calculation (FPIC and PPIC), for example, as described in the above-referenced U.S. Pat. No. 8,094,699. Yet another decoding application for the SCX and SSXC calculations described herein includes conventional matched filter detection without using PIC and also described in U.S. Pat. No. 8,094,699.

REFERENCES

The disclosures of all of the references listed herein are hereby incorporated herein by reference in their entireties.

[1] Ayman Elezabi, Alexandra Duel-Hallen, "Improved Viterbi Decoder Metrics for Two-Stage Detectors in DS-CDMA Systems", *IEEE Transactions on Wireless Communications*, vol. 3, pp. 1399-1404, September 2004.

[2] Ayman Elezabi and Alexandra Duel-Hallen "Single-User Decoder Metrics for Subtractive Interference Cancellation Detectors in Code-Division Multiple-Access (CDMA) Communication Systems", U.S. Pat. No. 7,035,317, Apr. 25, 2006.

[3] Ayman Elezabi, "Improved Turbo Decoding and Interference Cancellation for DS-CDMA with Random Spreading", *IEEE Vehicular Technology Conference*, Montreal, Canada, Sep. 25-28, 2006.

[4] Ayman Elezabi, "Methods and Systems for Demodulating a Multiuser Signal using Channel Decoders for a Multiple-Access Communication System" U.S. Pat. No. 8,094,699, Jan. 10, 2012.

[5] http://www.qualcomm.com/media/releases/2009/07/05/zte-and-qualcomm-collaborate-boost-umts-system-performance.

[6] M. K. Varanasi and B. Aazhang, "Multistage detection in asynchronous code-division multiple-access communications," *IEEE Trans. Comm.*, vol. 38, pp. 509-519, April 1990.

[7] Hossam Fahmy, Ayman Elezabi, "Bipolar sequences correlator and squarer for multiple-access systems", *42nd Annual Asilomar Conference on Signals, Systems, and Computers*, U.S.A., Oct. 26-29, 2008.

[8] Ayman Elezabi, Mohamed Kashef, Mohamed Abdallah, Mohamed Khairy, "Interference-Minimizing Code Assignment for Underlay CDMA Networks in Asynchronous Multipath Fading Channels", *Proc. of International Wireless Communications and Mobile Computing Conference*, June 2009, Leipzig, Germany.

It will be understood that various details of the presently disclosed subject matter may be changed without departing from the scope of the presently disclosed subject matter. Furthermore, the foregoing description is for the purpose of illustration only, and not for the purpose of limitation.

What is claimed is:

1. A method for simplified computation of metrics of cross-correlations of binary codes and for using the metrics for signal processing applications, the method comprising:

in a receiver including an outer product matrix calculator, a metric of cross correlations calculator, a single user decoder, and a despreader:

computing, by the outer product matrix calculator, an outer product matrix based on a first code vector, wherein the first code vector comprises a code vector for spreading code for a first single user and wherein computing the outer product matrix includes computing a first outer product matrix by multiplying the first code vector by a transpose of the first code vector;

computing, by the outer product matrix calculator, at least one second outer product matrix based on at least one second code vector, wherein the at least one second code vector comprises at least one second code vector for a spreading code for at least one second single user different from the first single user and wherein computing the outer product matrix based on the at least one second code vector includes computing the at least one second outer product matrix by multiplying the at least one second code vector by a transpose of the at least one second code vector;

computing, by the metric of cross correlations calculator, a metric of cross-correlations between the first code vector and the at least one second code vector using the first and the at least one second outer product matrices, wherein computing a metric of the cross-correlations includes computing a square or sum of squares of the cross-correlations by element-wise combination of the first and the at least one second outer product matrices and summing elements of the combination;

receiving, by the despreader, the code vector for the spreading code for the first single user and a multi-user signal and despreading the multi-user signal using the code vector for the spreading code of the first single user to produce, as output, a despread output signal; and decoding, by the single user decoder, from the despread output signal, and using the square or sum of squares of the cross correlations, a signal for the first single user.

2. The method of claim 1 wherein computing the outer product matrix based on the first code vector includes computing the product of each chip in the first code vector for the first single user with every other chip in the first code vector.

3. The method of claim 1 wherein computing the square or the sum of squares of the cross-correlations includes computing the square or the sum of squares without computing the cross-correlations.

4. The method of claim 1 wherein computing the square or the sum of squares of the cross-correlations includes computing the square or the sum of squares without performing a squaring operation.

5. The method of claim 1 wherein the metric of the cross-correlations comprises the sum of squares of the cross-correlations computed without performing a squaring operation.

6. The method of claim 5 wherein the sum of squares of the cross-correlations is computed by first computing the square of the cross-correlations.

7. The method of claim 6 wherein the sum of squares of the cross-correlations is computed using the outer product matrices without computing the square of the cross-correlations.

8. The method of claim 7 wherein computing the outer product matrices includes precomputing and storing the outer product matrices in advance of communications involving the first single user and the at least one second single user.

9. The method of claim 7 wherein computing the outer product matrix for the first single user includes computing the outer product matrix for the first single user when the first single user enters a communications system and deleting the outer product matrix for the first single user when the first single user leaves the communications system.

10. The method of claim 7 wherein the code vectors for the single user and the at least one second single user comprise bit asynchronous codes and further comprising circularly shifting the outer product matrix for the first single user to account for delay between the signal for the first single user and at least one signal of the at least one second single user.

11. The method of claim 7 wherein the code vectors for the first single user and the at least one second single user comprise bit synchronous codes.

12. The method of claim 7 wherein the signal for the first single user and the signal for the at least one second single user comprise chip-synchronous signals.

13. The method of claim 7 wherein the signal for the first single user and the signal for the at least one second single user comprise chip asynchronous signals.

14. The method of claim 1 wherein the first and the at least one second code vectors are code vectors for the spreading codes for the single user and the at least one second single user in a multiple access communication system.

15. The method of claim 1 wherein computing the outer product matrices includes computing the outer product matrices using only $(N^2-N)/2$ exclusive NOR (XNOR) operations per code, where N is a length of each of the codes.

16. The method of claim 1 wherein the code vectors represent short codes.

17. The method of claim 1 wherein the decoding comprises decoding in a multi-rate code division multiple access system.

18. A system for simplified computation of metrics of cross-correlations of binary codes and for using the metrics for signal processing applications, the system comprising:

a receiver, the receiver including:

an outer product matrix calculator for computing an outer product matrix based on a first code vector and for computing at least one second outer product matrix based on at least one second code vector, wherein the first code vector comprises a code vector for a spreading code a first single user and wherein computing the outer product matrix includes computing a first outer product matrix by multiplying the code vector for the spreading code of the first single user by the transpose of the code vector for the first single user and wherein the at least one second code vector comprises a code vector for at least one second single user different from the first single user and wherein computing the at least one second outer product matrix includes includes multiplying the at least one second code vector by a transpose of the at least one second code vector;

a metric of cross-correlations calculator for computing a metric of cross-correlations between the first code vector and the at least one second code vector using the outer product matrices, wherein computing a metric of the cross-correlations includes computing a square or sum of squares of the cross-correlations by element-wise combination of the first and the at least one second outer product matrices and summing elements of the combination;

a despreader for receiving the code vector for the spreading code for the first single user and a multi-user signal and despreading the multi-user signal using the code vector for the spreading code of the first single user to produce, as output, a despread output signal; and a single user decoder for decoding, from the despread output signal and using the square or sum of squares of the cross correlations, a signal for the first single user.

19. The system of claim 18 wherein computing the outer product matrix based on the first code vector includes computing the product of each chip in the first code vector for the first single user with every other chip in the first code vector.

20. The system of claim 18 wherein computing the square or the sum of squares of the cross-correlations includes computing the square or the sum of squares without computing the cross-correlations.

21. The system of claim 18 wherein computing the square or the sum of squares of the cross-correlations includes computing the square or the sum of squares without performing a squaring operation.

22. The system of claim 18 wherein the metric of the cross-correlations comprises the sum of squares of the cross-correlations computed without performing a squaring operation.

23. The system of claim 22 wherein the sum of squares of the cross-correlations is computed by first computing the square of the cross-correlations.

24. The system of claim 18 wherein the sum of squares of the cross-correlations is computed using the outer product matrices without computing the square of the cross-correlations.

25. The system of claim 18 wherein the first and the at least one second code vectors are code vectors for the first single user and the at least one at least one second user in a multiple access communication system.

26. The system of claim 25 wherein computing the outer product matrices includes precomputing and storing the outer product matrices in advance of communications involving the first single user and the at least one at least one second user.

27. The system of claim 25 wherein computing the outer product matrix for the first single user includes computing the outer product matrix for the first single user when the first single user enters a communications system and deleting the outer product matrix for the first single user when the single user leaves the communications system.

28. The system of claim 25 wherein the code vectors for the first single user and the at least one second single user comprise bit asynchronous codes and further comprising circularly shifting the outer product matrix for the first single user to account for delay between the signal for the first single user and a signal of the at least one the at least one second user.

29. The system of claim 25 wherein the code vectors for the first single user and the at least one second single user comprise bit synchronous codes.

30. The system of claim 25 wherein the signal for the first single user and a signal for the at least one second single user comprise chip-synchronous signals.

31. The system of claim 25 wherein the signal for the first single user and a signal for the at least one second single user comprise chip asynchronous signals.

32. The system of claim 18 wherein computing the outer product matrices includes computing the outer product matrices using only $(N^2-N)/2$ exclusive NOR (XNOR) operations per code, where N is a length of each of the codes.

33. The system of claim 18 wherein the code vectors represent short codes.

34. The system of claim 18 wherein the decoding comprises decoding in a multi-rate code division multiple access system.

35. A non-transitory computer readable medium having stored thereon executable instructions that when executed by the processor of a computer control the computer to perform steps comprising:

in a receiver including an outer product matrix calculator, a metric of cross correlations calculator, a single user decoder, and a despreader:

computing, by the outer product matrix calculator, an outer product matrix based on a first code vector, wherein the first code vector comprises a code vector for spreading code for a first single user and wherein computing the outer product matrix includes computing a first outer product matrix by multiplying the first code vector by a transpose of the first code vector;

computing, by the outer product matrix calculator, at least one second outer product matrix based on at least one second code vector, wherein the at least one second code vector comprises a code vector for a spreading code for at least one second user different from the first user and wherein computing the outer product matrix based on the at least one second code vector includes computing the at least one second outer product matrix by multiplying the at least one second code vector by a transpose of the at least one second code vector;

computing, by the metric of cross correlations calculator, a metric of cross-correlations between the first code vector and the at least one second code vector using the first and the at least one second outer product matrices, wherein computing a metric of the cross-correlations includes computing a square or sum of squares of the cross-correlations by element-wise combination of the first and the at least one second outer product matrices and summing elements of the combination;

receiving, by the despreader, the code vector for the spreading code for the first single user and a multi-user signal and despreading the multi-user signal using the code vector for the spreading code of the first single user to produce, as output, a despread output signal; and decoding, by the single user decoder, from the despread output signal, and using the square or sum of squares of the cross correlations, a signal for the first single user.

* * * * *